United States Patent
Peng (10) Patent No.: US 7,941,195 B2
(45) Date of Patent: *May 10, 2011

(54) PROTECTIVE MASK OF MOBILE PHONE

(75) Inventor: Kuan-Lin Peng, Taipei (TW)

(73) Assignee: Gregory J. Kim, Westmont, IL (US)

( * ) Notice: Subject to any disclaimer, the term of this patent is extended or adjusted under 35 U.S.C. 154(b) by 654 days.

This patent is subject to a terminal disclaimer.

(21) Appl. No.: 11/673,237

(22) Filed: Feb. 9, 2007

(65) Prior Publication Data

US 2007/0191079 A1      Aug. 16, 2007

Related U.S. Application Data

(63) Continuation of application No. 09/888,488, filed on Jun. 26, 2001, now Pat. No. 7,194,291.

(30) Foreign Application Priority Data

Nov. 17, 2000   (CN) .............................. 00 2 52902 U (51) Int. Cl.
*H04M 1/00* (2006.01)
(52) U.S. Cl. ................ 455/575.8; 455/550.1; 455/575.1
(58) Field of Classification Search .............. 455/575.8, 455/575.9, 575.1, 550.1, 90.1, 90.3, 348, 455/349, 550; 379/433.01, 433.11, 451
See application file for complete search history.

(56) References Cited

U.S. PATENT DOCUMENTS

| D211,355 S | 6/1968 | Farnham et al. |
|---|---|---|
| D219,451 S | 12/1970 | Blackman |
| 4,121,061 A | 10/1978 | Donaldson |
| 5,012,513 A | 4/1991 | Dale et al. |
| D337,435 S | 7/1993 | Kaneko et al. |
| D338,470 S | 8/1993 | Clayton |
| D342,262 S | 12/1993 | Hester |
| D348,472 S | 7/1994 | Cyfko |
| 5,383,091 A | 1/1995 | Snell |

(Continued)

FOREIGN PATENT DOCUMENTS

DE          20019958.7          2/2001

(Continued)

OTHER PUBLICATIONS

IL Telefono Cellulare & C. 2 pages. Date: Oct. 2000. (Shows replacement mobile telephone housing portions.).

*Primary Examiner* — Kent Chang
*Assistant Examiner* — Dinh P Nguyen
(74) *Attorney, Agent, or Firm* — Jansson Shupe & Munger Ltd.

(57) ABSTRACT

The present invention relates to a protective mask of mobile phone comprising an upper cover body and a lower cover body. The upper and lower cover bodies can be joined with a front and a tear phone housings of a mobile phone, respectively, to effectively prevent abrasion of the mobile phone due to carelessness of a user, thereby preventing ill-favored scars on the mobile phone. Therefore, the deterioration of the quality of the mobile phone and the fall of its value can be avoided. Moreover, trend and fashion of the mobile phone can be achieved without the need of replacing the mobile phone. Therefore, waste of money can be avoided, and economic burden to the user can be lessened.

12 Claims, 7 Drawing Sheets

U.S. PATENT DOCUMENTS

| | | |
|---|---|---|
| D365,927 S | 1/1996 | Cho |
| D369,903 S | 5/1996 | Tetrault |
| 5,586,704 A | 12/1996 | Alexander et al. |
| D382,538 S | 8/1997 | Brunette |
| D385,283 S | 10/1997 | Snyder et al. |
| D385,554 S | 10/1997 | Nuovo et al. |
| 5,678,204 A | 10/1997 | Naylor |
| D395,749 S | 7/1998 | Jayez |
| D396,951 S | 8/1998 | Huber |
| D397,246 S | 8/1998 | Hoofnagle et al. |
| 5,809,403 A | 9/1998 | MacDonald, Jr. et al. |
| D400,541 S | 11/1998 | Harrison |
| D408,402 S | 4/1999 | Shimelfarb et al. |
| 5,896,277 A | 4/1999 | Leon et al. |
| 5,933,330 A | 8/1999 | Beutler et al. |
| 5,988,577 A | 11/1999 | Phillips et al. |
| 6,006,074 A | 12/1999 | De Larminat et al. |
| 6,011,699 A | 1/2000 | Murray et al. |
| D425,907 S | 5/2000 | Frye et al. |
| 6,073,034 A | 6/2000 | Jacobsen et al. |
| 6,075,977 A | 6/2000 | Bayrami |
| 6,082,535 A | 7/2000 | Mitchell |
| 6,130,945 A | 10/2000 | Shin |
| 6,157,545 A | 12/2000 | Janninck et al. |
| 6,201,867 B1 | 3/2001 | Koike |
| D448,368 S | 9/2001 | Bettag et al. |
| 6,591,088 B1 | 7/2003 | Watanabe |
| 6,594,472 B1 | 7/2003 | Curtis et al. |
| 6,842,633 B1 | 1/2005 | Deo et al. |
| 7,194,291 B2 * | 3/2007 | Peng .......................... 455/575.8 |
| 2001/0034211 A1 | 10/2001 | Kuroshima et al. |
| 2002/0193136 A1 | 12/2002 | Halkosaari et al. |

FOREIGN PATENT DOCUMENTS

DE       20111112.8        9/2001

* cited by examiner

PROTECTIVE MASK OF MOBILE PHONE

CROSS-REFERENCE TO RELATED PATENT APPLICATIONS

This continuation application claims priority to U.S. patent application Ser. No. 09/888,488 filed Jun. 26, 2001, now U.S. Pat. No. 7,194,291 and Chinese Patent Application No. CN00252902.5 filed Nov. 17, 2000, which are expressly incorporated by reference herein.

FIELD OF THE INVENTION

The present invention relates to a protective mask of mobile phone and, more particularly, to an assembly structure used in a mobile phone

BACKGROUND OF THE INVENTION

Figure 1:
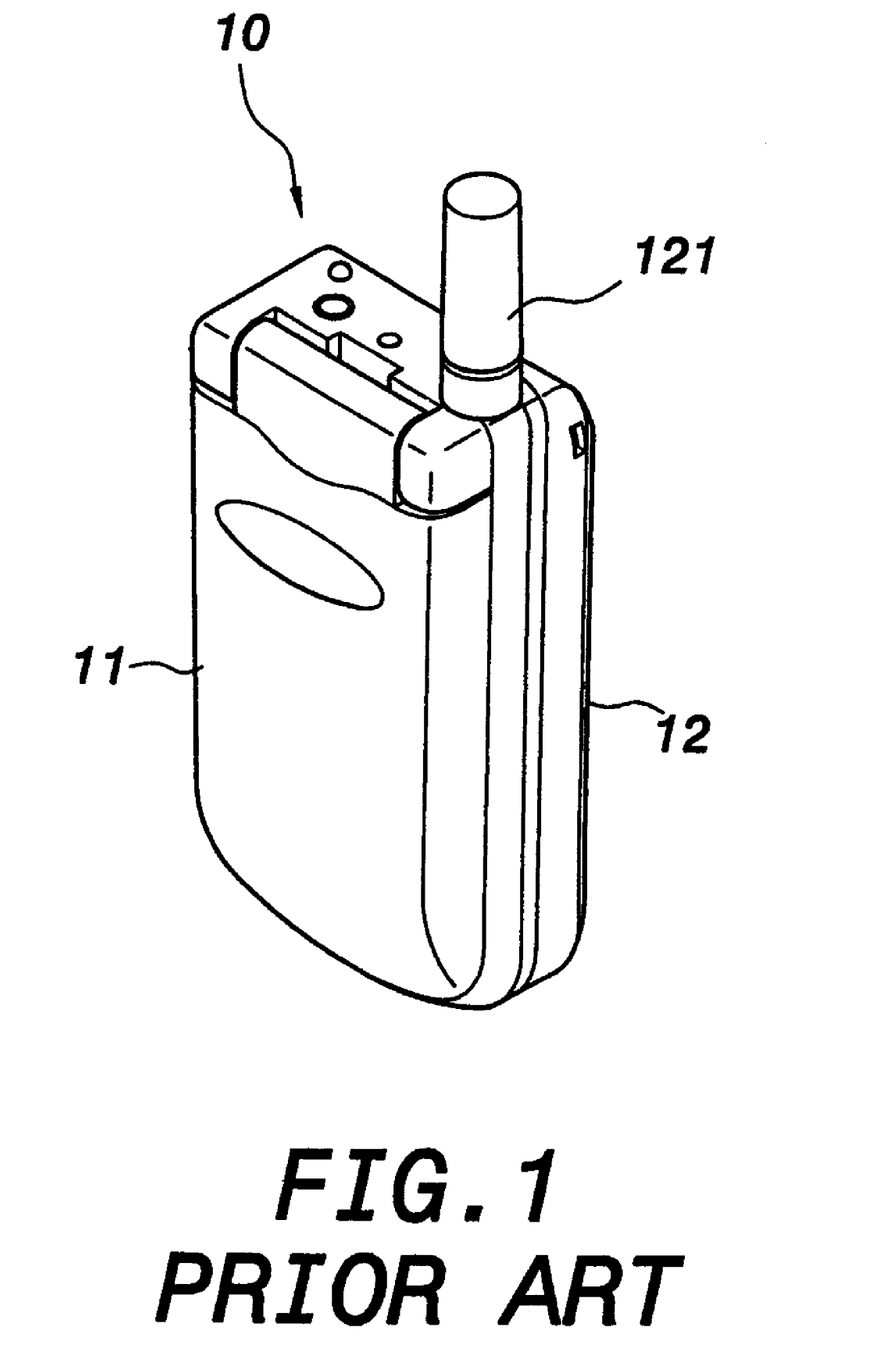
FIG. 1 is a perspective view of a prior art mobile phone.
Figure 2:
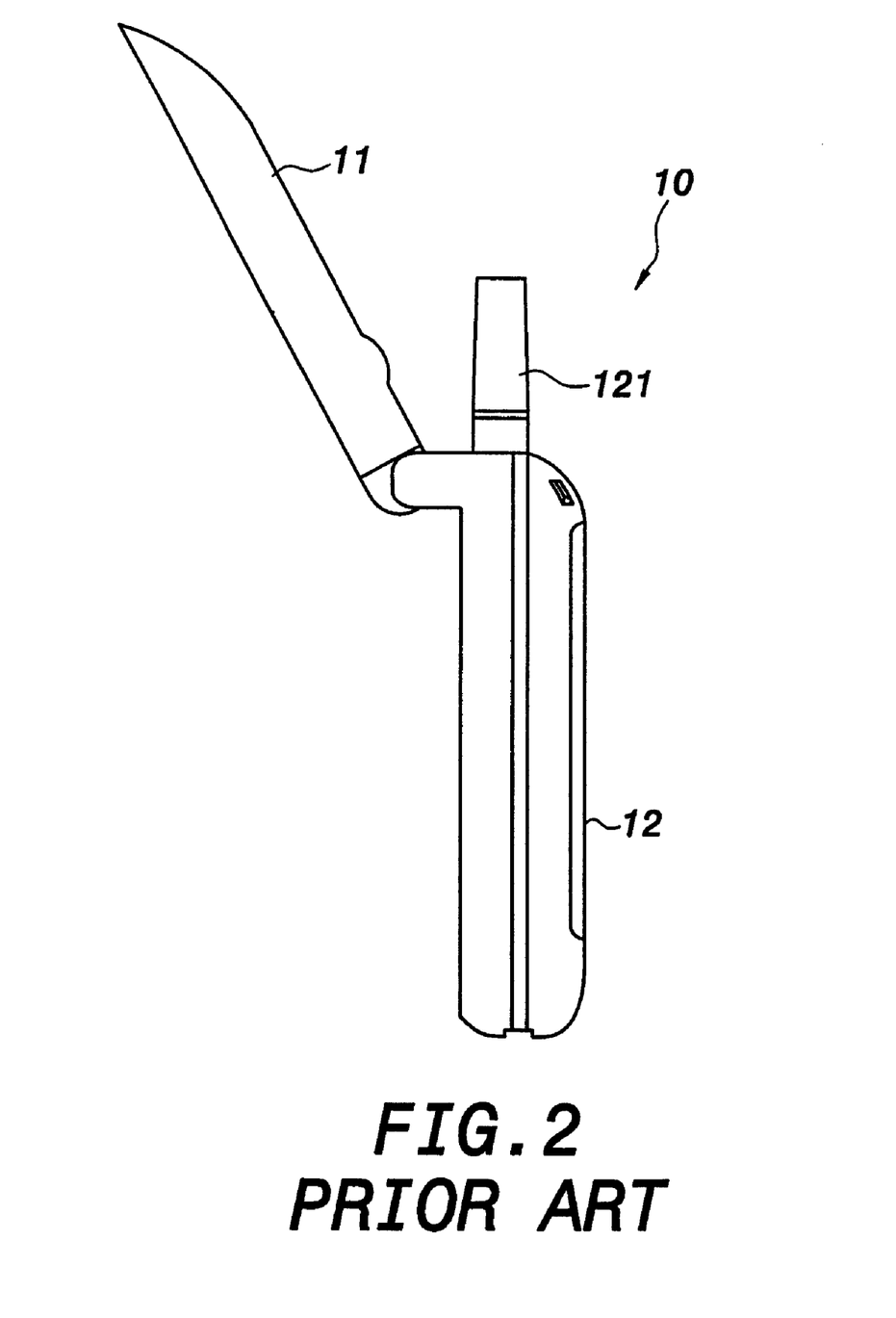
FIG. 2 is a diagram showing the use state of a prior art mobile phone.

FIGS. 1 and 2 show the structure of a prior art mobile phone. The outer look of the structure is approximately a rectangular parallelepiped comprising a front phone housing and a rear phone housing. One end of the front phone housing 11 is pivotally joined with one end of the rear phone housing 12, as shown in FIG. 2. An antenna 121 is disposed on the rear phone housing 12. A mobile phone 10 is formed after assembling the front and rear phone housings 11 and 12. The mobile phone 10 can be used for receiving a call, dialing a telephone number, making a call, displaying messages, and setting functions.

However, because the front and rear phone housings 11 and 12 of the mobile phone 10 are very smooth and delicate, abrasion may easily arise due to carelessness of a user so as to generate ill-favored scars thereon, resulting in the deterioration of the quality of the mobile phone and the fall of its value.

Moreover, the design of the mobile phone 10 tends to be more and more diversified in consideration of trend and fashion. The user usually spends a lot of money to change the mobile phone 10 to adhere to the fashion, resulting in waste of money.

Accordingly, the above mobile phone structure has inconvenience and drawbacks in practical installation and use. The present invention aims to resolve the problems in the prior art.

SUMMARY OF THE INVENTION

The primary object of the present invention is to provide a protective mask of mobile phone to effectively prevent abrasion of a mobile phone due to carelessness of a user, thereby preventing ill-favored scars on the mobile phone. Therefore, the deterioration of the quality of the mobile phone and the fall of its value can be avoided.

The secondary object of the present invention is to provide a protective mask of mobile phone so that trend and fashion of a mobile phone can be achieved without the need of replacing the mobile phone. Therefore, waste of money can be avoided, and economic burden to the user can be lessened.

To achieve the above objects, the present invention provides a protective mask of mobile phone comprising an upper cover body and a lower cover body. The upper and lower cover bodies are integrally formed by means of mold ejection of plastic. Patterns, types, or nameplates can be printed on the upper and lower cover bodies. The upper and lower cover bodies can sheathe a mobile phone therein. A gap, cavities, and slots corresponding to an antenna, an earphone cavity, an incoming-call informing light and so on of the mobile phone are disposed on the lower cover body so that a user can successfully receive a call and use various kinds of functions and settings of the mobile phone.

The various objects and advantages of the present invention will be more readily understood from the following detailed description when read in conjunction with the appended drawings, in which:

DETAILED DESCRIPTION OF THE PREFERRED EMBODIMENTS

As shown in FIGS. 3 to 6, the present invention relates to a protective mask of mobile phone and, more particularly, to an assembly structure used in a mobile phone. The protective mask of mobile phone of the present invention comprises an upper cover body 20 and a lower cover body 30.

Figure 3:
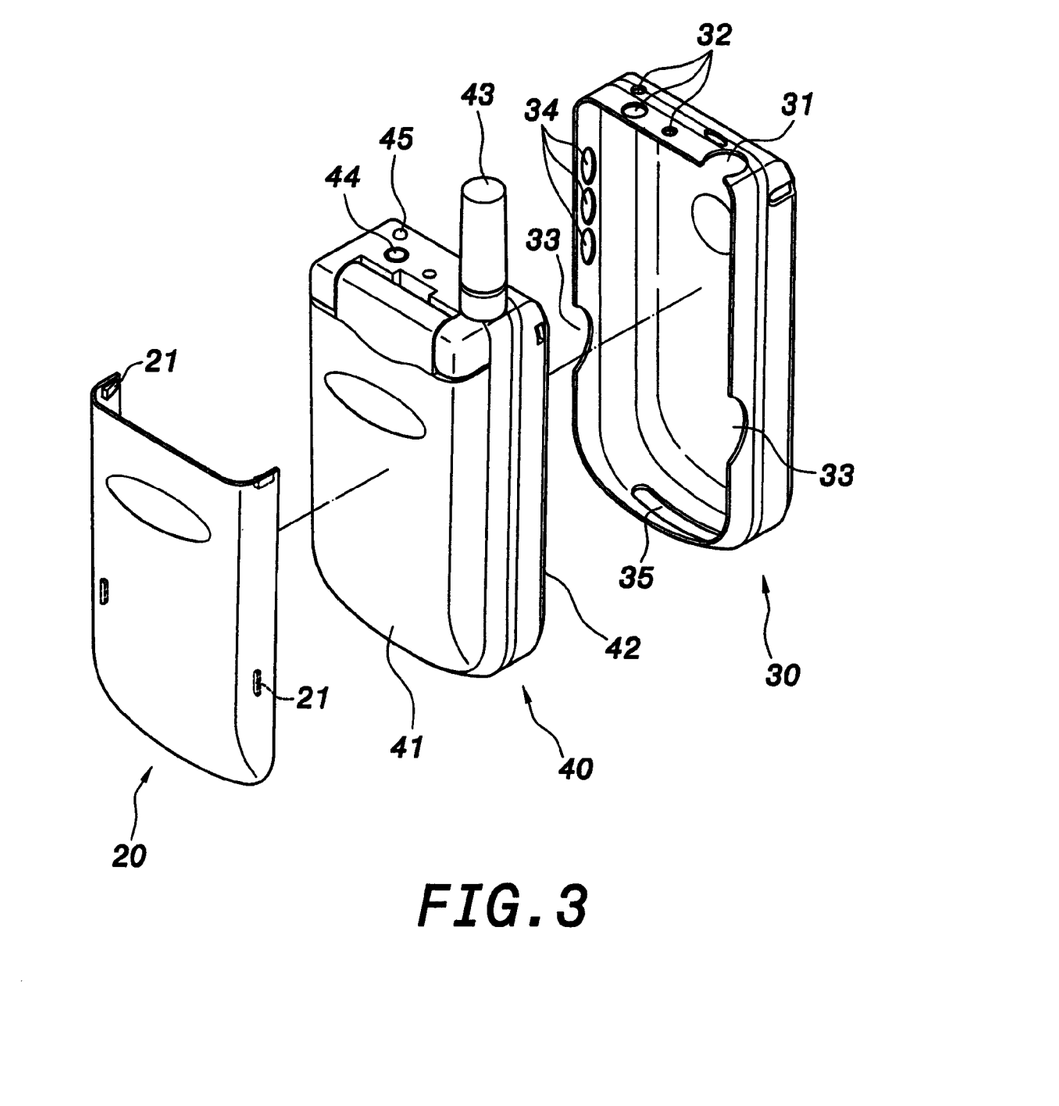
FIG. 3 is an exploded perspective view of the present invention and a mobile phone.
Figure 4:
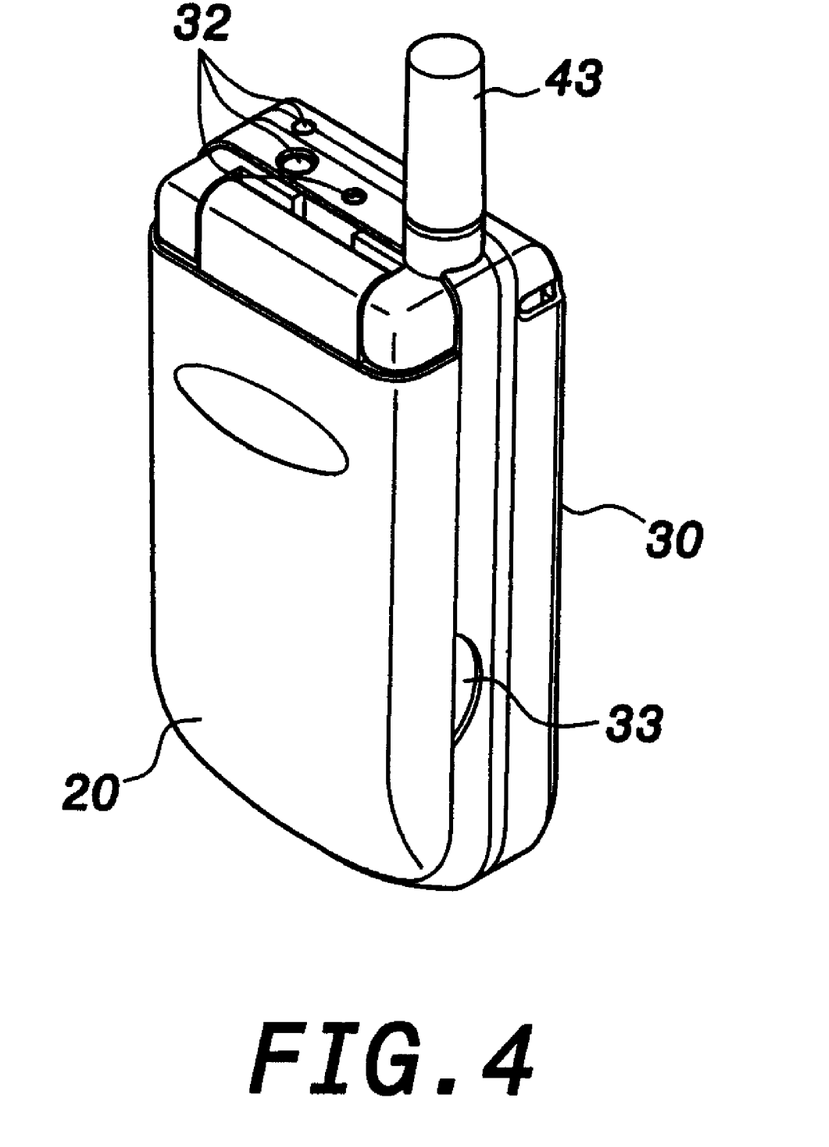
FIG. 4 is a perspective view of the present invention assembled with a mobile phone.
Figure 5:
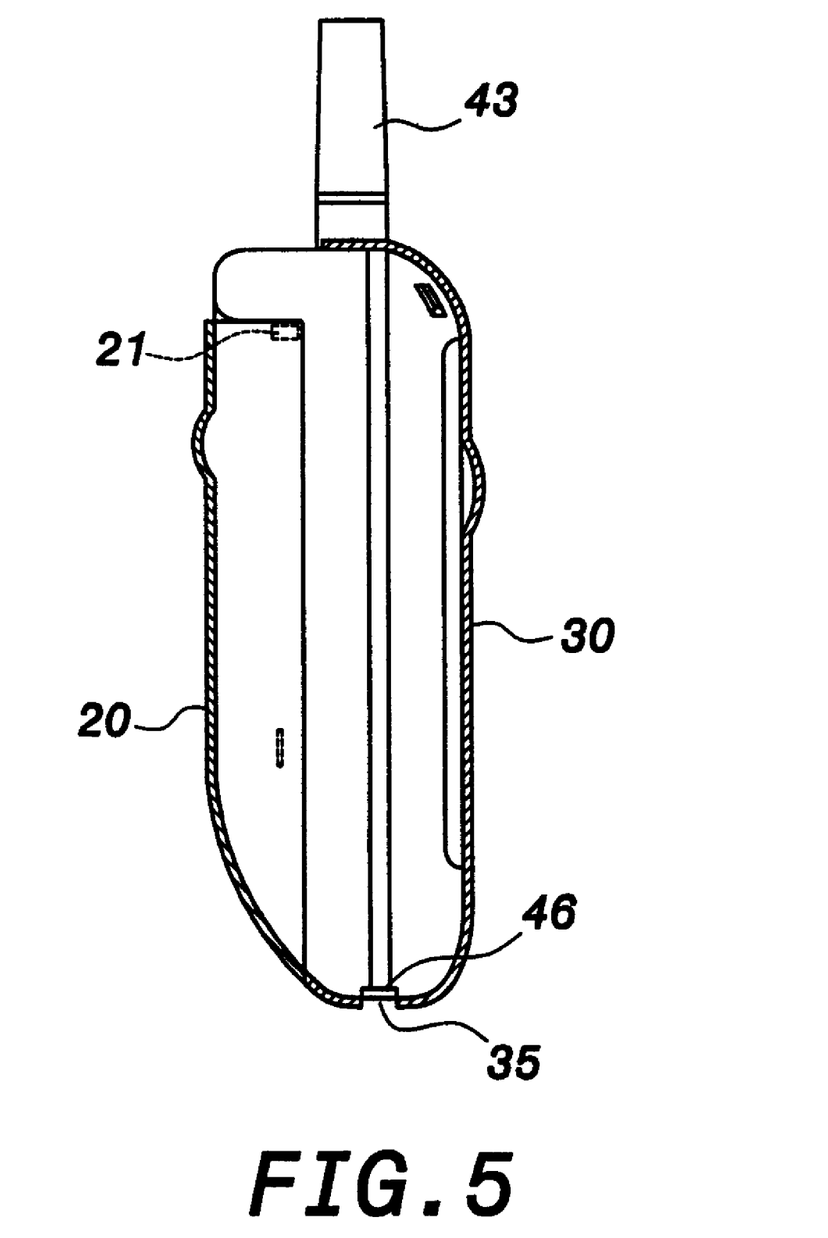
FIG. 5 is a cross-sectional view of the present invention assembled with a mobile phone.

The upper cover body 20 is integrally formed by mold ejection of plastic. Patterns, types, or nameplates can be printed on a front side face of the upper 20 cover body 20. The upper cover body 20 can be joined with a front phone housing 41 of a mobile phone 40, as shown in FIG. 4. A rear side face of the upper cover body 20 has a plurality of flanges 21, as shown in FIG. 3. The flanges 21 can be retained at the edge of the front phone housing 41 of the mobile phone 40. The front phone housing 41 of the mobile phone 40 can be sheathed in the upper cover body 20, as shown in FIG. 5.

The lower cover body 30 is integrally formed by mold ejection of plastic. Patterns, types, or nameplates can be printed on the lower cover body 30. The lower cover body 30 can be joined with a rear phone housing 42 of the mobile phone 40, as shown in FIG. 4. The lower cover body 30 has a gap 31 to retain an antenna 43 of the mobile phone 40, as shown in FIG. 3. A plurality of cavities 32 are disposed beside the gap 31 of the lower cover body 30. The cavities 32 can correspond to an earphone cavity 44, an incoming-call informing light 45 and so on of the mobile phone 40 so that a user can conveniently use the functions of the mobile phone 40.

Figure 6:
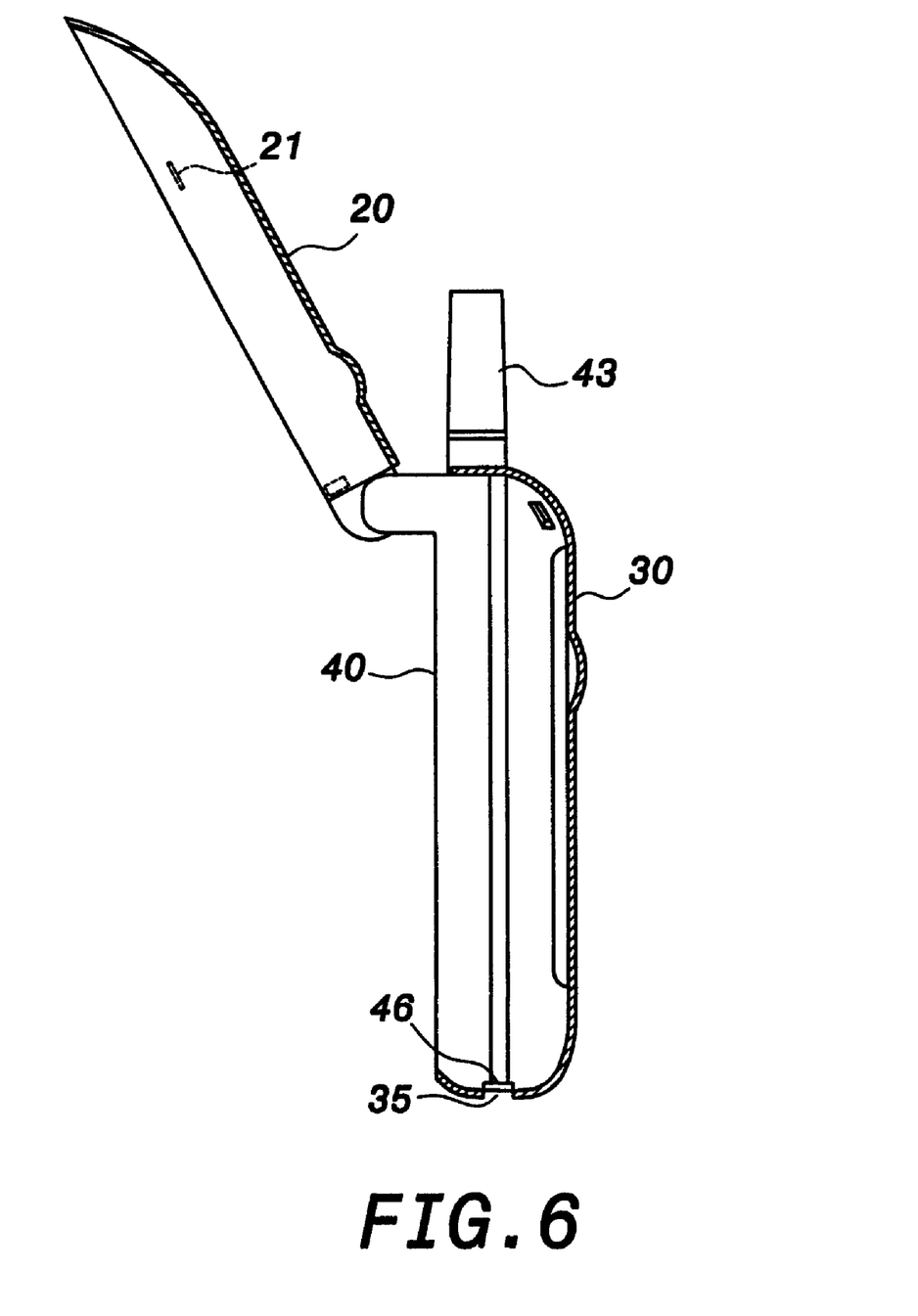
FIG. 6 is a diagram showing the use state of the present invention assembled 10 with a mobile phone.

Finger recessions 33 are respectively disposed at two sides of the lower cover body 30 so that a user can easily unfold the pivotally joined front phone housing 41 and rear phone housing 42 to receive a call or operate the mobile phone 40, as shown in FIG. 6. The finger recessions 33 can also let the user conveniently separate the mobile phone 40 and the lower cover body 30 for performing operations such as replacing a battery (not shown) of the mobile phone 40. A plurality of holes 34 are disposed at one side of the lower cover body 30. The holes 34 can correspond to function keys (not shown) of the-mobile phone 40 so that the user can successfully receive a call or set functions.

A bottom of the lower cover body 30 has a slot 35, which can correspond to a socket 46 (shown in FIG. 5) of the mobile phone 40 so that a user can plug in a power supply (not shown) of the mobile phone 40 to charge or recharge the mobile phone 40.

Figure 7:
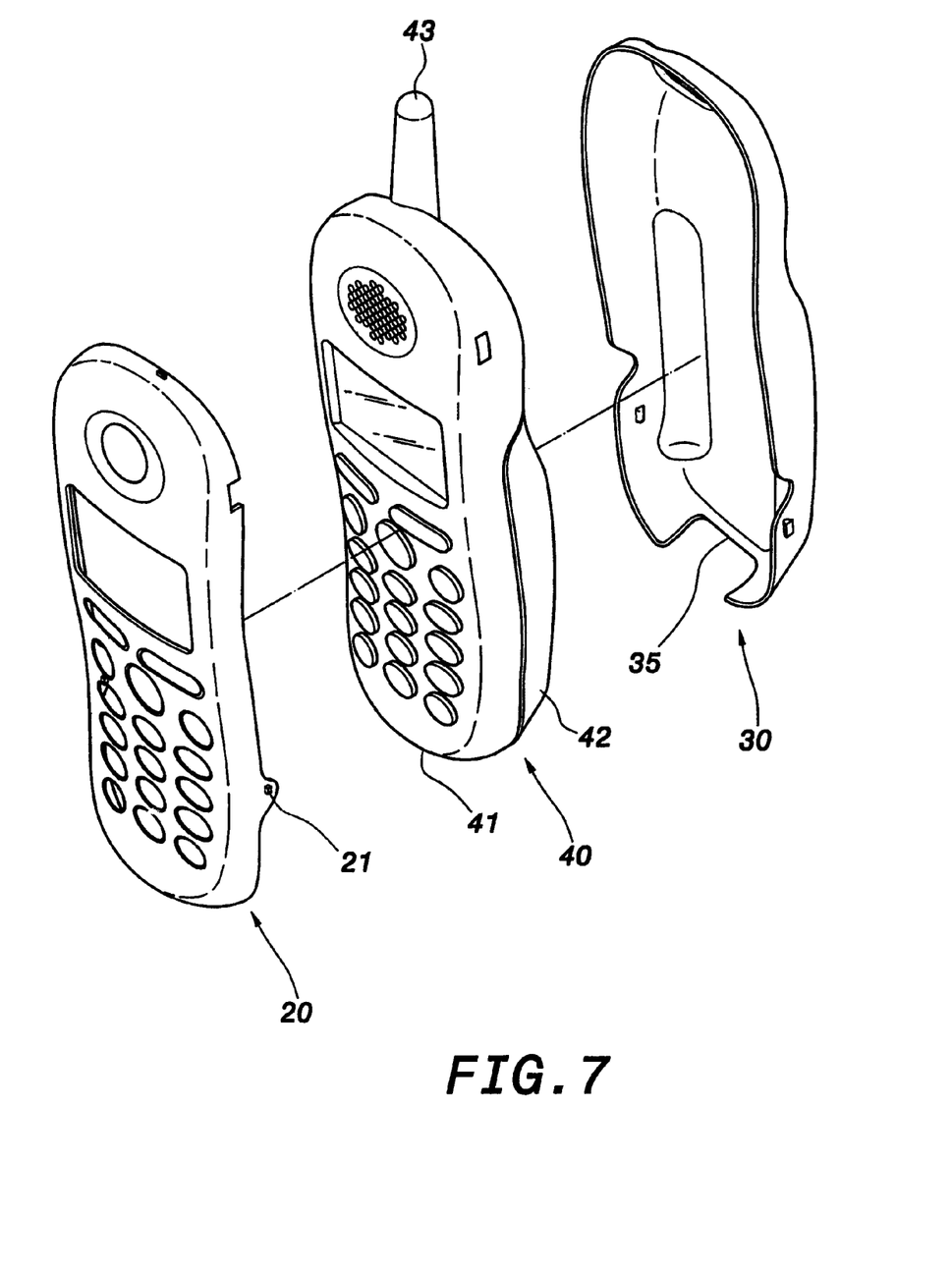
FIG. 7 is an exploded perspective view according to a second embodiment of the present invention.

As shown in FIG. 7, a different upper cover body 20 and a different lower cover body 30 are matched according to the outer look of a different mobile phone 40 so as to satisfy users having different mobile phones 40. The connection and disposition ways are the same as the above first embodiment of the present invention.

The present invention uses the upper cover body 20 and the lower cover body 30 to sheathe the mobile phone 40 therein so as to effectively prevent abrasion of the mobile phone 40 due to the carelessness of a user, thereby preventing ill-favored scars on the mobile phone. Moreover, trend and fashion of the mobile phone 40 can be achieved without the need of replacing the mobile phone 40.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A protective mask adapted to be coupled to an exterior housing of a mobile phone having internal components including circuitry and a battery, which are covered by the exterior housing, the protective mask comprising:
   a first mask portion, molded to conform to the shape of a first portion of the exterior housing of the mobile phone, the first mask portion adapted to be coupled to the mobile phone to retain the first mask portion to the first portion of the exterior housing so that the first mask portion covers the first portion of the exterior housing of the mobile phone; and
   a second mask portion, molded to conform to the shape of a second portion of the exterior housing of the mobile phone, the second mask portion adapted to be coupled to the mobile phone to retain the second mask portion to the second portion of the exterior housing so that the second mask portion covers the second portion of the exterior housing of the mobile phone;
   wherein said first and second mask portions are retained to the exterior housing of the mobile phone.

2. The protective mask of claim 1, wherein patterns, types, or nameplates can be printed on said first and second mask portions.

3. The protective mask of claim 1, wherein the first mask portion includes at least one opening to permit access to features of the mobile phone.

4. The protective mask of claim 1, wherein said second mask portion includes at least one opening to permit access to features of the mobile phone.

5. The protective mask of claim 1, wherein said second mask portion includes an opening corresponding to a socket of said mobile phone so that a user can conveniently plug in a power supply to charge said mobile phone.

6. A protective mask adapted to be coupled to an exterior housing of a mobile phone, the mobile phone having internal components including circuitry and a battery, which are covered by the exterior housing, the protective mask comprising:
   a first mask portion, molded to conform to the shape of a first portion of the exterior housing of the mobile phone, the first mask portion is adapted to be coupled to the mobile phone to retain the first mask portion to the first portion of the exterior housing so that the first mask portion covers the first portion of the exterior housing of the mobile phone;
   said first mask portion including an opening that is associated with an opening in the exterior housing to permit access to a feature of the mobile phone; and
   a second mask portion, molded to conform to the shape of a second portion of the exterior housing of the mobile phone, the second mask portion adapted to be coupled to the mobile phone to retain the second mask portion to the second portion of the exterior housing so that the second mask portion covers the second portion of the exterior housing of the mobile phone;
   wherein said first and second mask portions are retained to the exterior housing of the mobile phone.

7. The protective mask of claim 6, wherein patterns, types, or nameplates can be printed on said first and second mask portions.

8. The protective mask of claim 6, wherein the second mask portion includes an opening to permit access to a feature of the mobile phone.

9. A protective mask adapted to be coupled to an exterior housing of a mobile phone having internal components including circuitry and a battery, which are covered by the exterior housing, the protective mask comprising:
   a first mask portion, molded to conform to the shape of a first portion of the exterior housing of the mobile phone, the first mask portion having flanges to allow the first mask portion to be coupled to the mobile phone to retain the first mask portion to the first portion of the exterior housing so that the first mask portion covers the first portion of the exterior housing of the mobile phone.

10. The protective mask of claim 9, further comprising a second mask portion, molded to conform to the shape of a second portion of the exterior housing of the mobile phone, the second mask portion adapted to be coupled to the mobile phone to retain the second mask portion to the second portion of the exterior housing so that the second mask portion covers the second portion of the exterior housing of the mobile phone.

11. The protective mask of claim 10, wherein patterns, types, or nameplates can be printed on the first and second mask portions.

12. The protective mask of claim 11, wherein the first mask portion includes at least one opening to permit access to features of the mobile phone.

* * * * *